United States Patent [19]

Hahs et al.

[11] 4,442,861

[45] Apr. 17, 1984

[54] VALVE FOR GAS CENTRIFUGES

[75] Inventors: Charles A. Hahs; Charles H. Burbage, both of Oak Ridge, Tenn.

[73] Assignee: The United States of America as represented by the United States Department of Energy, Washington, D.C.

[21] Appl. No.: 358,963

[22] Filed: Mar. 17, 1982

[51] Int. Cl.³ ............... F16K 11/14; F16K 31/126
[52] U.S. Cl. ............... 137/595; 137/869; 137/871; 251/61
[58] Field of Search ............ 137/595, 596.18, 869, 137/871; 251/31, 61, 61.4

[56] References Cited

U.S. PATENT DOCUMENTS

| | | | |
|---|---|---|---|
| 2,286,282 | 6/1942 | Joesting | 137/869 X |
| 3,036,807 | 5/1962 | Lucky et al. | 251/31 X |
| 3,057,205 | 10/1962 | Howard et al. | 137/869 X |
| 3,115,895 | 12/1963 | Fister et al. | 137/595 |
| 3,144,877 | 8/1964 | Prybylski et al. | 137/595 |
| 4,151,860 | 5/1979 | Chromik | 137/595 |
| 4,213,481 | 7/1980 | Benjamin | 137/596.18 |
| 4,228,817 | 10/1980 | Weaver | 137/595 X |
| 4,289,167 | 9/1981 | Switall | 137/869 |

FOREIGN PATENT DOCUMENTS

| | | | |
|---|---|---|---|
| 1272667 | 7/1968 | Fed. Rep. of Germany | 251/61.4 |
| 2272319 | 12/1975 | France | 251/61 |

*Primary Examiner*—Gerald A. Michalsky
*Attorney, Agent, or Firm*—Fred O. Lewis; Stephen D. Hamel; Michael F. Esposito

[57] ABSTRACT

The invention is a pneumatically operated valve assembly for simultaneously (1) closing gas-transfer lines connected to a gas centrifuge or the like and (2) establishing a recycle path between two of the lines so closed. The valve assembly is especially designed to be compact, fast-acting, reliable, and comparatively inexpensive. It provides large reductions in capital costs for gas-centrifuge cascades.

11 Claims, 2 Drawing Figures

VALVE FOR GAS CENTRIFUGES

This invention is a result of a contract with the United States Department of Energy.

BACKGROUND OF THE INVENTION

This invention relates generally to pneumatic block valves and more particularly to a multiport valve designed for use with gas centrifuges. One type of gas centrifuge with which this invention can be used is described in U.S. Pat. No. 3,946,942, issued to Gorden R. Theurich on Mar. 30, 1976, and incorporated herein by reference.

A proposed facility for the large-scale separation of uranium isotopes utilizes tens of thousands of gas centrifuges which are interconnected as a separation cascade. The cascade is designed to receive a feed stream of process gas ($UF_6$) and to separate the same into a product stream enriched in the uranium-235 isotope and a waste stream depleted in that isotope. The interior of the typical cascade centrifuge is connected to three lines for the admission and withdrawal of process gas. These are a feed line for introducing $UF_6$ to the centrifuge; a product line for removing enriched $UF_6$ therefrom; and a waste line for removing depleted $UF_6$ therefrom. Valves must be provided in each of these lines to isolate the centrifuge if it fails mechanically. In the event of such failure, these valves are actuated immediately to isolate the failed centrifuge from the remainder of the cascade. Without such isolation, the failure might generate pressure surges which could propagate throughout the cascade $UF_6$ piping and cause catastrophic failure of other centrifuges. The typical centrifuge also is provided with a normally closed $UF_6$-bypass valve: in the event the centrifuge is isolated as described, this valve is opened to interconnect the isolated feed and product lines, thus placing the isolated machine on $UF_6$ recycle.

A previous system for isolating and bypassing a gas centrifuge included four separate, individually actuated pneumatic valves. Three of these valves were connected respectively in the above-mentioned $UF_6$ lines to isolate the typical centrifuge; the other was connected between the product and feed lines, to bypass product as described. The typical separate isolation valve comprised a reciprocatable plug assembly including a helical spring. The plug assembly was affixed to a plunger individually associated therewith. Air pressure was applied to the plunger to maintain its plug assembly in the valve-open position and its spring in compression. Removal of the air pressure permitted the spring to drive its plug assembly to the closed position. The single bypass plug assembly, which included a spring and a plunger, was maintained in its normally closed position by its spring and was opened when air was applied to its plunger. A multiport solenoid valve was used to supply air to the respective actuators of the valves.

The above-described system was found to be undesirably complex, bulky and expensive. For example, the volume of air required to operate the various valves necessitated a relatively large and costly solenoid valve. Also, the system required numerous air lines and fittings. Furthermore, the system was costly.

SUMMARY OF THE INVENTION

Accordingly, it is an object of this invention to provide a novel valve for isolating a gas centrifuge from its process-gas transfer lines.

It is another object to provide a novel valve for placing a gas centrifuge on gas-recycle when so isolated.

It is another object to provide a fast-closing, reliable valve having a plurality of symmetrically loaded plug assemblies.

It is another object to provide a relatively simple and inexpensive multiport valve whose ports can be connected to those of a similar valve at one interface.

Other objects and advantages will be made apparent herein.

In one aspect, the invention is a valve assembly which includes a casing having an axis and a portion which is vented. An axially displaceable diaphragm assembly sealably bridges the casing and defines a vented chamber with the vented casing portion. The diaphragm assembly includes a shaft coaxial with the casing. A partition in the casing defines a sealed second chamber with the diaphragm assembly and includes means for slidably engaging its shaft. The casing is provided with a port for admitting actuating-fluid means to the sealed chamber to effect displacement of the diaphragm assembly away from the partition and to a normal operating position. The diaphragm assembly shaft supports an axially displaceable actuator-plate assembly which sealably bridges the casing and which defines, with the partition, a third chamber. A seal plate bridges the casing and is formed with axial bores; the seal plate and actuator define a fourth chamber. A body in the casing has a plurality of passages which are respectively aligned with the bores in the seal plate and which contain respective valve seats. A plurality of shafts are coupled to the plate assembly for movement therewith. The shafts extend respectively through the bores and into the passages, and carry valve plugs which are out of contact with the valve seats when the diaphragm assembly is in its normal operating position.

DETAILED DESCRIPTION OF THE INVENTION

Figure 1:
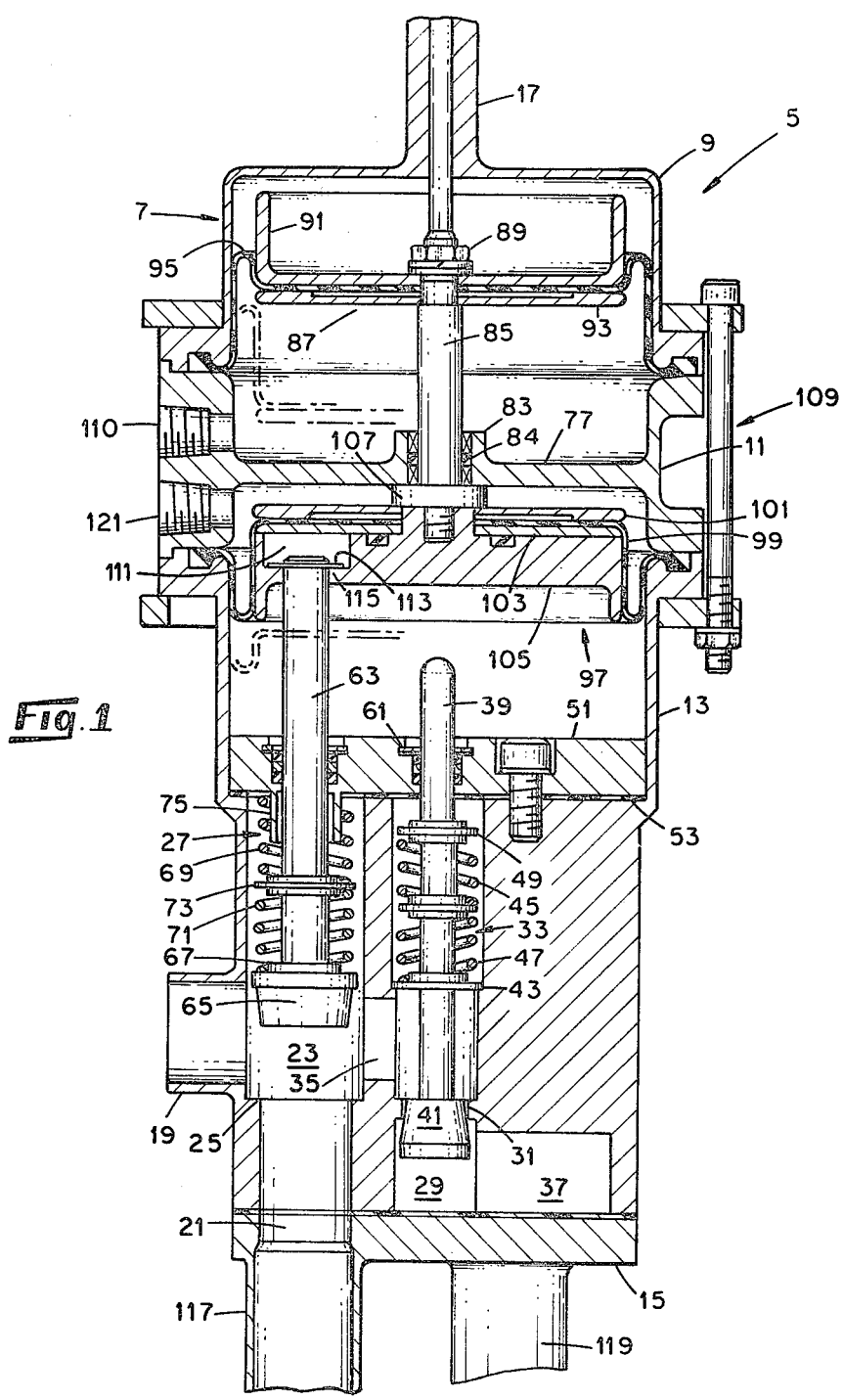
FIG. 1 is a central longitudinal section of a gas-centrifuge isolation and bypass valve designed in accordance with the invention. The valve is shown in an operating position where three $UF_6$ flow channels are open and a $UF_6$ bypass channel is closed.

Referring to FIG. 1, the invention is illustrated in terms of a compact, vertically oriented valve assembly 5, shown in what will be referred to as the normal operating position. (The valve assembly is usable in any orientation.) The valve includes a generally cylindrical sealed casing 7. The casing includes, in descending order, a cap 9; a cylinder housing 11; a valve body 13; and a bottom plate 15, which is sealably affixed to the valve body. The cap 9 is vented to atmosphere through side openings (not shown) and is formed with a tubular axial extension 17, a side portion of which is cut away to permit observation of the valve position. The valve body 13 is provided with three horizontally aligned side ports, one of which (19) is in view, and the bottom plate is formed with three ports spaced at 120° intervals about the major axis of the casing. One of the bottom ports (21) is in view. The side ports communicate respectively with the bottom ports through normally open, vertical passages, each passage being offset from the longitudinal axis of the valve assembly and containing an annular valve seat and a plug assembly for mating with the seat. A typical offset passage 23, its seat 25, and its plug assembly 27 are in view in FIG. 1.

As shown, the valve body 13 also is formed with a normally closed, central, vertical passage 29 containing an annular seat 31 and a plug assembly 33 extending through the seat. The side port 19 communicates via a bore 35 with the portion of passage 29 above seat 31, whereas one of the bottom ports (not in view) connects via a bore 37 with the portion of passage 29 below seat 31.

The central plug assembly 33 includes a shaft 39 whose lower end carries a tapered Teflon plug 41. The shaft extends upward through seat 31 and a bushing 43, the latter being supported by a shoulder in passage 29, and then through right-hand end and left-hand helical springs 45 and 47, which are mounted between spring guides 49 affixed to the shaft. The upper end of the shaft extends through a seal plate 51, which is fitted in the upper end of the valve body 13 and fastened thereto. A gasket seal 53 is provided between body 13 and plate 51. The shaft 39 is slidably sealed to the plate 51 by an assembly which includes, in ascending order, a conventional Teflon lip seal and garter spring assembly; a spacer ring; a conventional Quad ring, and a snap ring 61 engaged with the seal plate.

The typical offset plug assembly 27 includes a shaft 63 whose lower end carries a tapered Teflon plug 65, positioned above its seat 25. A shoulder 67 on the plug supports an assembly including righthand and left-hand springs 69 and 71 and a spring guide 73. The shaft extends through the springs, a bushing 75 extending from the bottom of seal plate 51, the guide 73, and a sealing assembly of the kind described, carried by the seal plate.

As shown in FIG. 1, the cylinder housing 11 includes a horizontal web 77 which partitions the region above seal plate 51. The web carries a central bearing 83 which incorporates a coaxial lip seal 84 of the kind described. Slidably fitted in the bearing and seal is a vertical rod 85 which extends upwardly through a diaphragm assembly 87 and into the tubular extension 17 of cap 9. The rod is sealably clamped to the diaphragm assembly by a nut 89. The diaphragm assembly includes a cup-shaped member 91, a retainer cap 93, and a flexible sealing diaphragm 95 clamped therebetween. The rim of the diaphragm is sealably clamped between cap 9 and the housing 11. Because of the aforementioned vents in cap 9, the chamber defined by the cap and diaphragm 95 is always at atmospheric pressure.

As shown, the lower end of rod 85 is threaded into an actuator-plate assembly 97. The assembly includes a sealing diaphragm 99 of the kind described, which is mounted between a retainer cap 101 and a spacer 103, carried by an actuator plate 105. A shoulder 107 on rod 85 clamps the assembly. The rim of the diaphragm 99 is sealably clamped between housing 11 and valve body 13. The clamping of the casing components 6, 11, and 13 is accomplished with external bolt-and-ring assemblies, such as 109.

The bottom of the actuator plate 105 is provided with cutouts for respectively supporting the aforementioned offset plug assemblies. In the typical arrangement shown, the shaft 63 of offset plug-assembly 17 extends into cutout 111; a snap ring 113 affixed to the shaft normally rests on an annular shoulder 115 of the actuator plate. As shown, the shaft 39 of the central plug assembly 33 extends above seal plate 51 but normally is spaced from the actuator plate assembly 97.

In the embodiment shown in FIG. 1, passage 23 of the valve is connected into the $UF_6$ feed line 117 of the gas centrifuge. That is, with the valves positioned as shown, $UF_6$ feed enters port 21 and exits port 19. The waste $UF_6$ line 119 of the centrifuge is connected to the rearmost bottom port, so that waste $UF_6$ enters that port and exits from its associated side port (not in view). The product line (not in view) is connected to the third bottom port so that product $UF_6$ from the centrifuge flows into the port and out its associated side port. This third bottom port also is in communication, through bore 37, with the bypass passage 29, now closed.

Referring to the operation of the valve assembly 5, the chamber defined by the web 77 and diaphragm 95 is provided with a side port 10. The port is connected to receive actuating air from an external solenoid valve (not shown). The air is at a superatmospheric pressure sufficient to displace the diaphragm assembly 87 upward to the position shown, thus lifting the actuator-plate assembly 97 and the outer plug assemblies depending therefrom to the normal operating positions indicated. The axially offset valves now are open and the springs in the offset plug assemblies are in compression. At this time, the central plug assembly 33 is maintained by its springs in the seated position shown—i.e., the $UF_6$ bypass valve is closed.

In response to, say, an abnormal pressure increase in the gas centrifuge, instrumentation immediately actuates the aforementioned solenoid valve to dump air from the chamber just below the diaphragm assembly 87. As a result, the above-mentioned compressed springs immediately expand, driving the offset plug assemblies to their valve-closed positions and isolating the failed centrifuge from other centrifuges normally connected thereto. The descending offset plug assemblies pull the actuating-plate and diaphragm assemblies downward to positions where their diaphragms assume the positions indicated by broken lines. As it descends, the actuator plate 105 engages the central plug assembly 33 forcing it downward and opening the bypass valve, thus connecting the product line to the feed line 117 and permitting product $UF_6$ being pumped from the centrifuge to recycle through the feed line. If actuating air now is re-applied to the valve assembly, the offset plug assemblies are lifted to their normal positions, whereupon the springs 47 and 45 expand to reclose the bypass valve.

To meet gas-centrifuge cascade requirements, the above-described valve is designed to be fast-closing, compact, reliable, and relatively inexpensive. The closing time for the valve of FIG. 1 is less than 120 milliseconds. Reproducible, positive sealing is accomplished by utilizing tapered plastic plugs in combination with knife-edge valve seats—i.e., seats having an edge radius of from about 5-10 mils. It is also important from the standpoint of reliability that the offset plug assemblies be maintained in exact alignment with their valve seats. This is accomplished in part by providing means for maintaining the actuator plate 105 concentric with the longitudinal axis of the assembly. That is, bushings 17 and 83 guide the shaft 85 along the axis. Similarly, individual bushings (e.g., 75) guide the offset plug assemblies.

Figure 2:
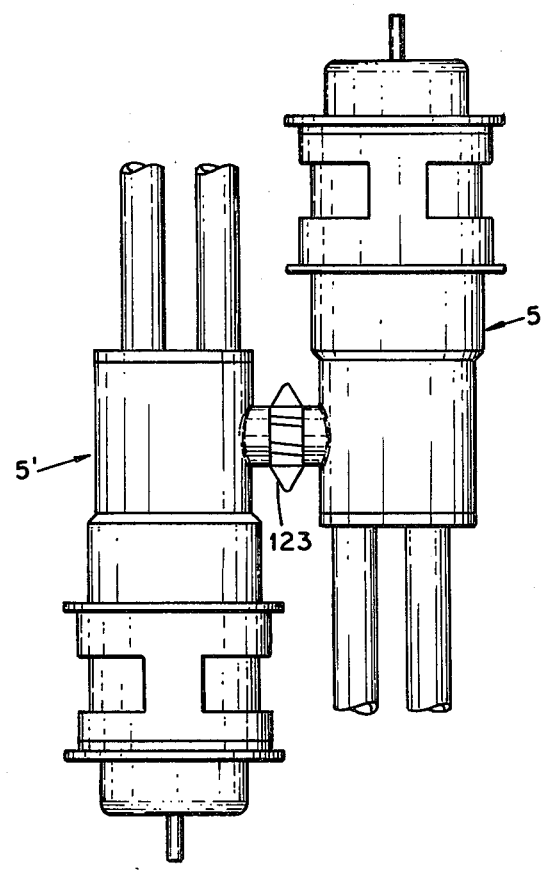
FIG. 2 is a schematic diagram showing two such valves connected in series.

The four plug assemblies are each provided with right- and left-hand springs of identical design, thus limiting the amount of the torque imparted to the valve plugs during opening and closing, and eliminating the need for anti-rotation devices. The use of individual sets of springs provides compensation for changes (e.g., "creep") of the valve-plug surfaces. It will be noted that the diaphragm 99 acts as a backup seal for the various shaft seal assemblies. A port 121 may be provided for connecting means for detecting any leakage of $UF_6$ into the chamber just above the actuator-plate assembly. The aforementioned cap extension 17 is cut away to permit visual determination of the valve positions as indicated by the height of shaft 85. Referring to FIG. 2, in some applications it may be desirable to connect two of the valve assemblies 5 and 5' in series. A highly compact arrangement is achieved by positioning the two valves as shown, with their side ports in register and with sealing rings therebetween. A single conventional V-band fixture 123 may be used to clamp the side ports.

The present valve design takes advantage of the economies of die-casting. Compared to the previously used system (see "Background"), the new valve also provides a valuable decrease in bulk and complexity. Furthermore, the use of a single larger actuator provides an equal load on the various valve plugs while reducing the required actuating air pressure and volume by about half. Compared with the previous system, a valve designed provided as in FIG. 1 provides a reduction in capital cost of about $3000 for every centrifuge in the cascade.

The foregoing description has been provided for the purposes of explanation and illustration. In view of the teaching herein, various modifications and alterations will be apparent to one versed in the art. It is intended that the scope of the invention be defined by the claims appended hereto.

What is claimed is:

1. A valve assembly, comprising:
   (a) a casing having an axis, said casing including a portion formed with a vent,
   (b) an axially displaceable diaphragm assembly sealably bridging said casing and including a shaft extending along said axis, said assembly and the vented portion said casing defining a vented chamber,
   (c) a partition in said casing including means for slidably engaging said shaft, said partition and diaphragm assembly defining a sealed second chamber,
   (d) a port in said casing for admitting, to the second chamber, actuating-fluid means for effecting displacement of said diaphragm assembly away from said partition to a normal operating position,
   (e) an axially displaceable actuator-plate assembly sealably bridging said casing and supported by said shaft, said plate assembly and partition defining a third chamber,
   (f) a seal plate bridging said casing and formed with throughgoing bores extending in the direction of said axis, said seal plate and actuator-plate assembly defining a fourth chamber,
   (g) a body in said casing having a plurality of passages respectively aligned with said bores and respectively containing valve seats, and
   (h) a plurality of shafts which are coupled to said plate assembly to move axially therewith, said shafts respectively extending through said bores and into said passages and carrying plugs which are out of contact with said seats when said diaphragm assembly is in said normal position.

2. The valve assembly of claim 1 wherein said shafts respectively carry spring means which are in compression when said diaphragm assembly is in said normal position.

3. The valve assembly of claim 1 wherein said casing is formed with a tubular guide for receiving and guiding an end of the diaphragm assembly shaft.

4. The valve assembly of claim 1 wherein said means for slidably engaging the diaphragm assembly shaft includes a bearing and a seal for said shaft.

5. The valve assembly of claim 1 wherein said bores in said seal plate are disposed symmetrically about said axis.

6. The valve assembly of claim 1 wherein said seal plate carries bushings for respectively guiding said shafts coupled to said plate assembly.

7. The valve assembly of claim 1 wherein said bores in said seal plate contain means for slidably sealing their respective shafts.

8. The valve assembly of claim 1 further characterized by said seal plate being formed with a central throughgoing bore and said body being formed with a central passage, said passage containing a central valve seat.

9. The valve assembly of claim 8 further characterized by a shaft which is supported by said body and extends (1) through said seal plate, (2) into said central passage, and (3) through said central valve seat, said shaft being spring-loaded toward said plate assembly to a normal operating position where a plug carried by said shaft is engaged with said central seat and where said shaft is spaced from said plate assembly.

10. A valve assembly, comprising:
    (a) a casing having an axis, said casing including a portion formed with a vent,
    (b) an axially displaceable diaphragm assembly sealably bridging said casing and including a shaft extending along said axis, said assembly and the vented portion of said casing defining a vented chamber,
    (c) a partition of said casing including means for slidably engaging said shaft, said partition and diaphragm assembly defining a sealed second chamber,
    (d) a port in said casing for admitting, to the second chamber, actuating-fluid means for effecting displacement of said diaphragm assembly from an initial position relatively close to said partition to a normal operating position more remote therefrom,
    (e) an axially displaceable actuator-plate assembly sealably bridging said casing and supported by said shaft, said plate assembly and partition defining a third chamber,
    (f) a seal plate bridging said casing and formed with a throughgoing central bore and throughgoing axially offset bores, said seal plate and actuator-plate assembly defining a fourth chamber,
    (g) body in said casing having a plurality of passages respectively aligned with the bores in said seal plate and respectively containing valve seats,
    (h) a plurality of axially offset shafts which are coupled to said plate assembly for movement therewith, said shafts respectively extending through said offset bores and their associated passages and carrying plugs which are spaced from their associated seats when said diaphragm assembly is in said normal position, said offset shafts carrying spring means which are in compression against said seal plate when said diaphragm assembly is in said normal position, and (i) a centrally disposed shaft supported by said body and extending (1) through said central bore, (2) into the passage aligned therewith, and (3) through the seat associated therewith, said shaft being spring-loaded toward said plate assembly to a normal operating position where a plug carried by said shaft is engaged with said seat associated therewith and where said shaft is separated from said plate assembly by a selected spacing.

11. The valve assembly of claim 10 wherein said spacing is such that when said diaphragm assembly is in said initial position, said actuator plate assembly is in contact with said shaft and maintains it in a displaced position where its plug is spaced from its associated seat.

* * * * *